United States Patent
Kashani

[11] Patent Number: 5,785,099
[45] Date of Patent: Jul. 28, 1998

[54] AUTOMOBILE REFUELING GUARD

[75] Inventor: Mir Saied Kashani, Los Angeles, Calif.

[73] Assignee: Saied Mir Kashani, Los Angeles, Calif.

[21] Appl. No.: 395,943

[22] Filed: Feb. 28, 1995

[51] Int. Cl.⁶ .................................................. B65B 1/04
[52] U.S. Cl. .................................................. 141/86; 141/392
[58] Field of Search ............................. 141/86–88, 311 A, 141/390–392, 286, 337, 338, 370, 372; 220/731, 733, 86.2; 296/97.22, 38; 280/770

[56] References Cited

U.S. PATENT DOCUMENTS

| | | | |
|---|---|---|---|
| 2,467,001 | 4/1949 | Allen | 280/153 |
| 2,555,868 | 6/1951 | Bowman | 226/129 |
| 2,659,523 | 11/1953 | Comber | 141/390 |
| 3,804,134 | 4/1974 | Wehking | 141/337 |
| 3,992,051 | 11/1976 | Hitch | 141/390 |
| 4,698,861 | 10/1987 | Bogusz | 141/391 |
| 4,817,691 | 4/1989 | Lau | 141/86 |
| 4,830,067 | 5/1989 | Foutch | 141/186 |
| 5,184,751 | 2/1993 | Middleton | 141/86 |

*Primary Examiner*—Henry J. Recla
*Assistant Examiner*—Steven O. Douglas
*Attorney, Agent, or Firm*—Arnold, White & Durkee

[57] ABSTRACT

A fuel guard that protects the fender area of an automobile's surface from damage caused by gasoline spills during refueling and marring caused by incidental contact with the fuel pump nozzle.

7 Claims, 6 Drawing Sheets

5,785,099

AUTOMOBILE REFUELING GUARD

BACKGROUND OF THE INVENTION

1. Field of the Invention

Today, more people than ever refuel their automobiles themselves to take advantage of the lower prices of self-service gasoline stations. Without the service of the skilled, professional service station attendant, many people spill fuel from the fuel pump nozzle or the automobile's fuel fill pipe onto their automobile's surface. Such spills can happen even when people are being meticulously careful while refilling their automobiles because fuel often surges out of the fuel fill pipe or drips from the nozzle when it is removed from the fuel fill pipe. These gasoline spills can permanently damage the automobile's finish. In addition, an automobile's finish can be scratched or marred during refueling by incidental contact with the fuel pump nozzle. The present invention protects an automobile by minimizing the risk of damage from such fuel spills and scratches.

2. Prior Art

A variety of devices have previously been proposed and implemented for protecting an automobile's surface against fuel spillage. One such device is the "Protective Bib For Vehicles" disclosed in U.S. Pat. No. 2,659,523 to Comber. Comber suggests the use of a flat rectangular bib with an aperture having an elaborate mounting device attached around it as a form of seal to prevent fuel from escaping from any gaps around the aperture in the event of a spill, together with a method of mounting the bib onto an automobile's fuel fill pipe. The bib is made of flexible rubber with a single raised bead around its entire periphery to prevent the dripping fuel from landing on the automobile. In a spill situation, however, any overflowing fuel will fall over the raised bead. Because this device is flat on both sides, it will hug the body curves of the automobile, so that if a spill occurs, the overflowing fuel will flow naturally with the automobile's contour and onto unprotected areas of the body.

Another device is the "Protector For Automobile Fuel Filler Neck" disclosed in U.S. Pat. No. 3,992,051 to Hitch. Hitch suggests permanently attaching the protector to the automobile by drilling holes through the automobile's fuel fill compartment. The installation of Hitch's design is therefore unnecessarily complicated and unattractive to users who are reluctant to permanently alter the body of their automobile.

Another device is the "Protective Fuel Bib Using Flexible Sheet with Trough Shaper" disclosed in U.S. Pat. No. 4,817,691 to Lau. Lau's design requires the use of a supporter attached to the underside of the bib to cause the bib to assume a trough-shape, a V-shape, or a W-shape in order to direct gasoline away from the automobile. The supporter is constructed from wire or some other firm but partially flexible material. The requirement of the supporter, however, imposes two problems. First, the supporter must be attached to the bib through some sort of adhesive that retains its adhesive quality despite the long-term exposure to gasoline that is likely to occur during usage and storage of the bib. Second, the use of wire or some other firm material for the supporter is likely eventually to pierce any protective coating around it and scratch the automobile's surface. In addition, the Lau trough feature causes the bib to extend outward from the side of the car just beneath the fuel fill compartment. Because the fuel pump nozzle and gas line point downwards when inserted into the automobile's fuel fill pipe, the nozzle and gas line when inserted will displace the Lau bib and possibly cause it to snap downwards against the side of the car. Moreover, because the Lau bib extends outward from the car, the user will not be able to rest the front of the fuel pump nozzle against the bib if he or she desires to leave the nozzle unattended while refueling.

SUMMARY OF THE INVENTION

The invention described below is an automobile protective fuel fill guard that protects an automobile's finish from damage caused by fuel spills and incidental contact between the automobile and fuel pump nozzle. The invention has the following advantages over the prior art:

It is easily attachable to the automobile and must be installed only once on a vehicle.

Its means of attachment to the automobile's fuel fill pipe is designed to fit all makes of automobiles and trucks.

It is compact and super flexible so that it can be rolled-up and tucked into the fuel fill compartment for convenient out-of-sight storage.

It includes a side tab that enables the user to roll-up the guard for storage without having to touch the front surface of the guard which may contain some residual spilled fuel.

It tracks the curves of the automobile so that a user may rest the fuel pump nozzle against it if the user desires to leave the fuel pump unattended during refueling.

It contains raised interior ridges that form channels to direct spilled fuel towards the bottom edge of the guard.

It contains a raised outmost ridge running along the top and side edges of the guard to prevent spilled fuel from spilling over the top or sides of the guard.

It contains stand-offs on the back of the guard that separate the bottom edge of the guard from the automobile's surface so as to direct spilled fuel off the bottom edge and onto the ground; and it can be trimmed on the sides and bottom so that it can fit into smaller fuel fill compartments.

Additional objects and advantages of the invention will become apparent from the consideration of the drawings and the detailed description of the invention provided below.

DETAILED DESCRIPTION OF A PREFERRED EMBODIMENT

An apparatus is described for protecting an automobile's surface from damage cause by fuel spills or contact with the fuel pump nozzle during refueling. Although numerous specific details are given to provide a thorough understanding of the invention, it will be obvious to one skilled in the art that the invention can be practiced without these specific details.

Figure 1:
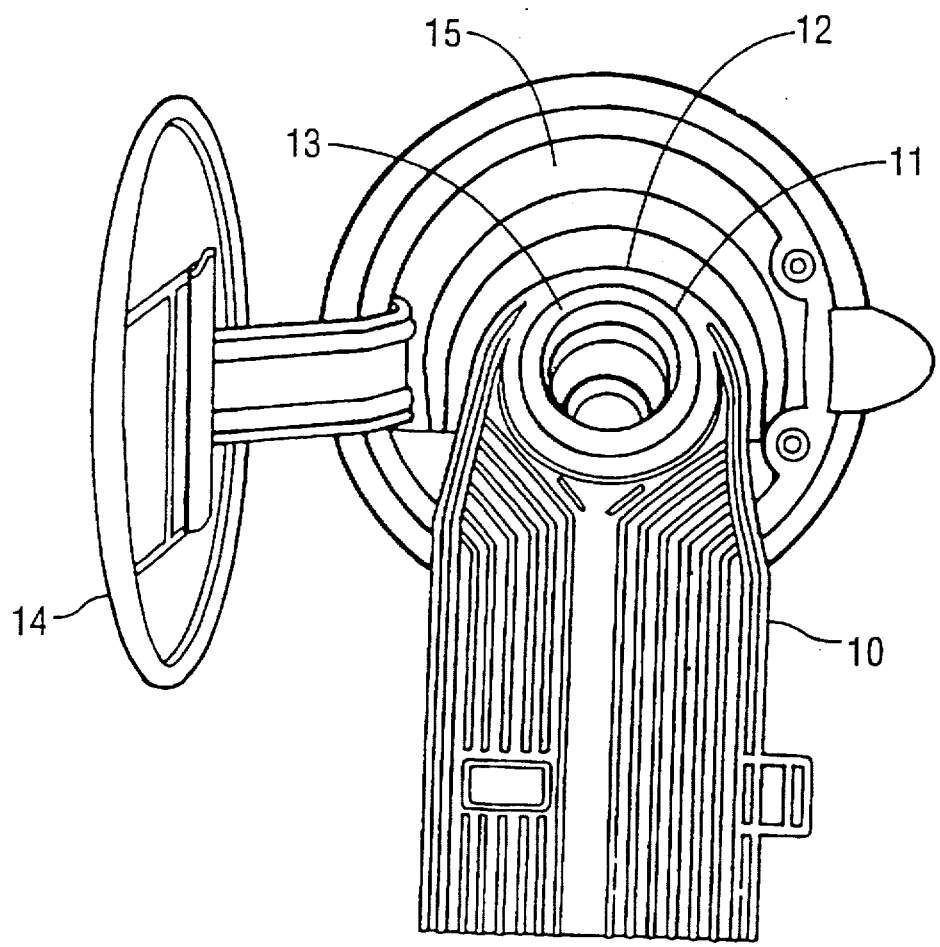
FIG. 1 shows the front view of the presently preferred embodiment attached to the fuel fill pipe of an automobile's fuel tank and in the in-use position.

FIG. 1 depicts the presently preferred embodiment of the fuel guard attached to the fuel fill pipe of an automobile's fuel tank. This embodiment consists of a flat sheet of flexible, rubber material 10. In this embodiment, an aperture 11 adjacent to the curved top edge 12 of the sheet is stretched over the automobile's fuel fill pipe 13. The elasticity of the rubber enables the guard to fit fuel fill pipes of varying sizes. In other embodiments, a different means of attachment, such as a flexible collar or webbing made of elastic cord, could be used to secure the fuel guard to the fuel fill pipe.

As shown in FIG. 1, when the door 14 to the automobile's fuel fill compartment 15 is open, the sheet 10 extends down along the fender area of the automobile. When the guard is so extended, it is in the in-use position.

Figure 2:
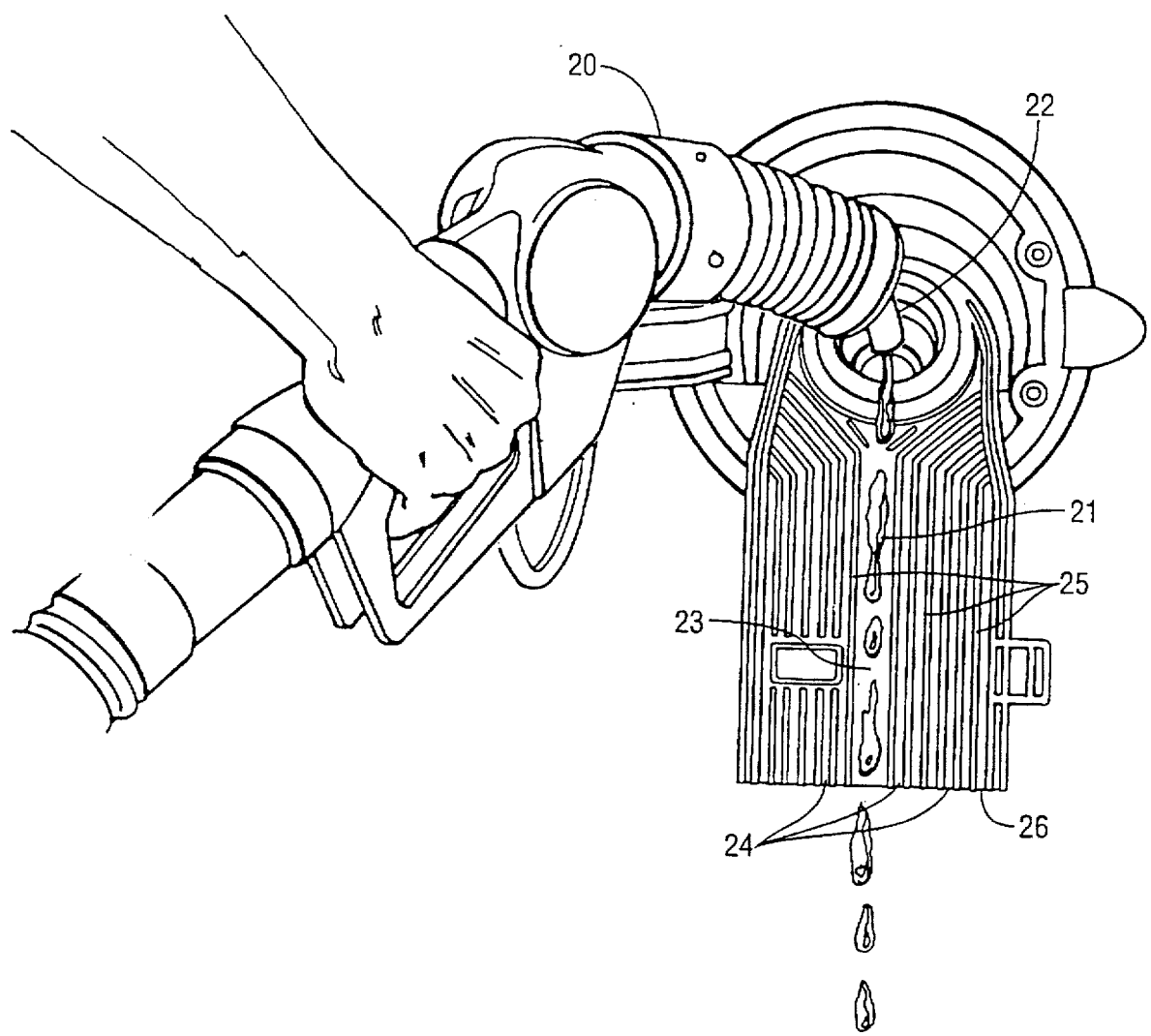
FIG. 2 is a front view of the preferred embodiment installed on an automobile and shows the operation of the funneling grooves to direct spilled fuel down the length of the guard.

FIG. 2 shows an example of the presently preferred embodiment in operation. In this example, the user is removing the fuel pump nozzle 20 and gasoline 21 is spilling from the end of the nozzle 22. The spilled gasoline 21 makes contact with the front surface 23 of the fuel guard and is directed down the front surface 23 of the fuel guard in channels 24 formed on the front surface 23 by several raised interior ridges 25. When the gasoline 21 reaches the bottom edge 26 of the fuel guard, it drips off the bottom edge 26 onto the ground.

Figure 3:
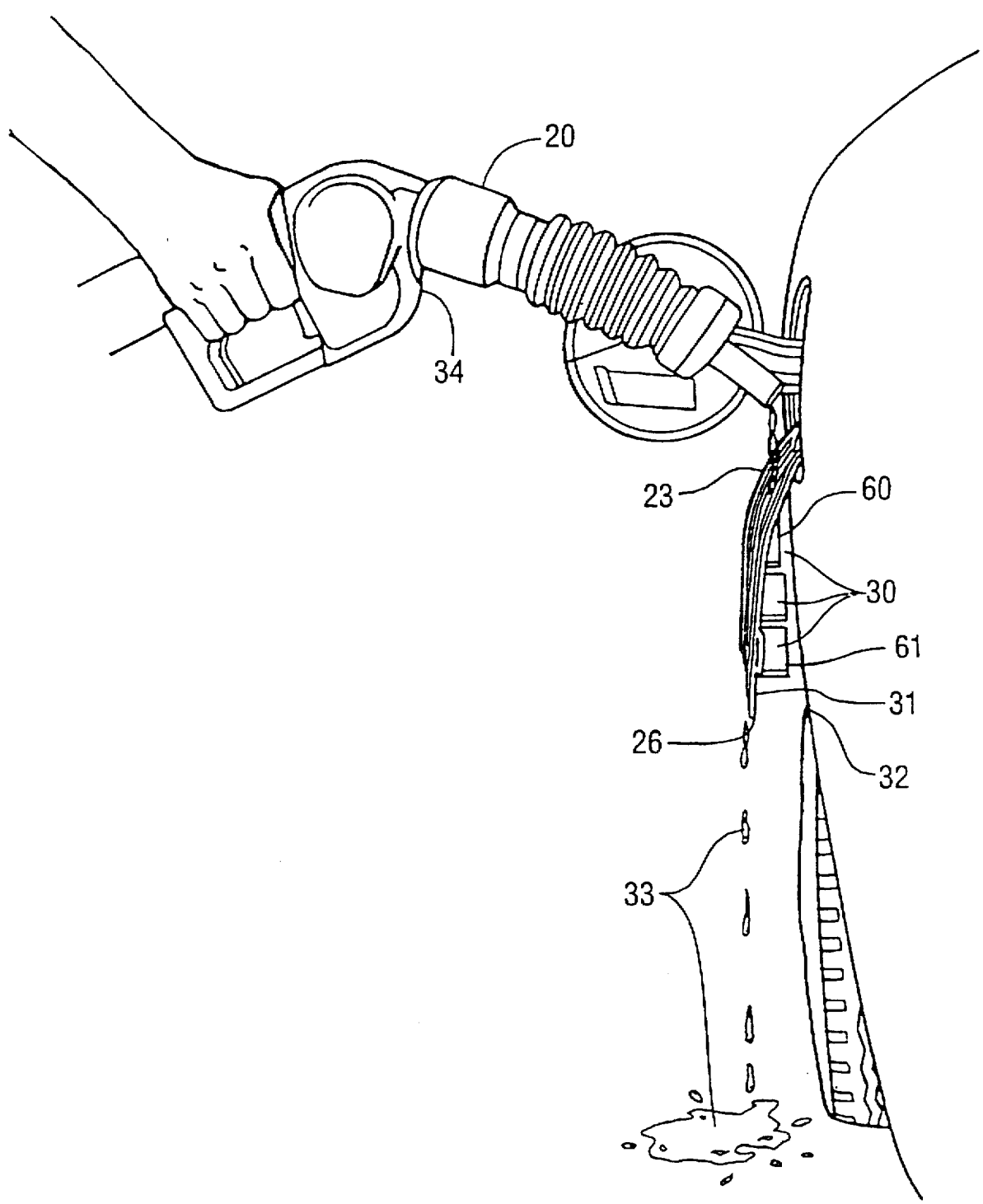
FIG. 3 is a side view of the preferred embodiment showing the operation of the stand-offs on the back of the fuel guard to direct spilled fuel onto the ground away from the surface of the automobile.

FIG. 3 shows a side view of the presently preferred embodiment in operation. This view illustrates the operation of the stand-offs 30 located on the back surface 31 of the guard to keep the bottom edge 26 of the fuel guard away from the surface 32 of the automobile. The stand-offs 30 assure that run-off fuel 33 drips onto the ground and not onto the side of the automobile. The stand-offs 30 are shown from a different view in FIG. 6, as explained below.

Although not shown, it is easy to understand from FIG. 3 how the fuel guard also protects against scratches caused by incidental contact between the automobile and the fuel pump nozzle. For example, if the user wants to leave the fuel pump nozzle 20 unattended during refueling, he or she can fully insert the fuel pump nozzle 20 into the fuel fill pipe and rest the front surface 34 of the handle of the fuel pump nozzle 20 against the front surface 23 of the guard. The presence of the fuel guard protects against scratching while the fuel pump nozzle 20 is in this position. Moreover, the fuel guard protects the fender area of the automobile against scratches or marring caused by incidental contact between the automobile and the fuel pump while inserting or removing the fuel pump nozzle 20 from the fuel fill pipe 13 (shown in FIG. 1).

Figure 4:
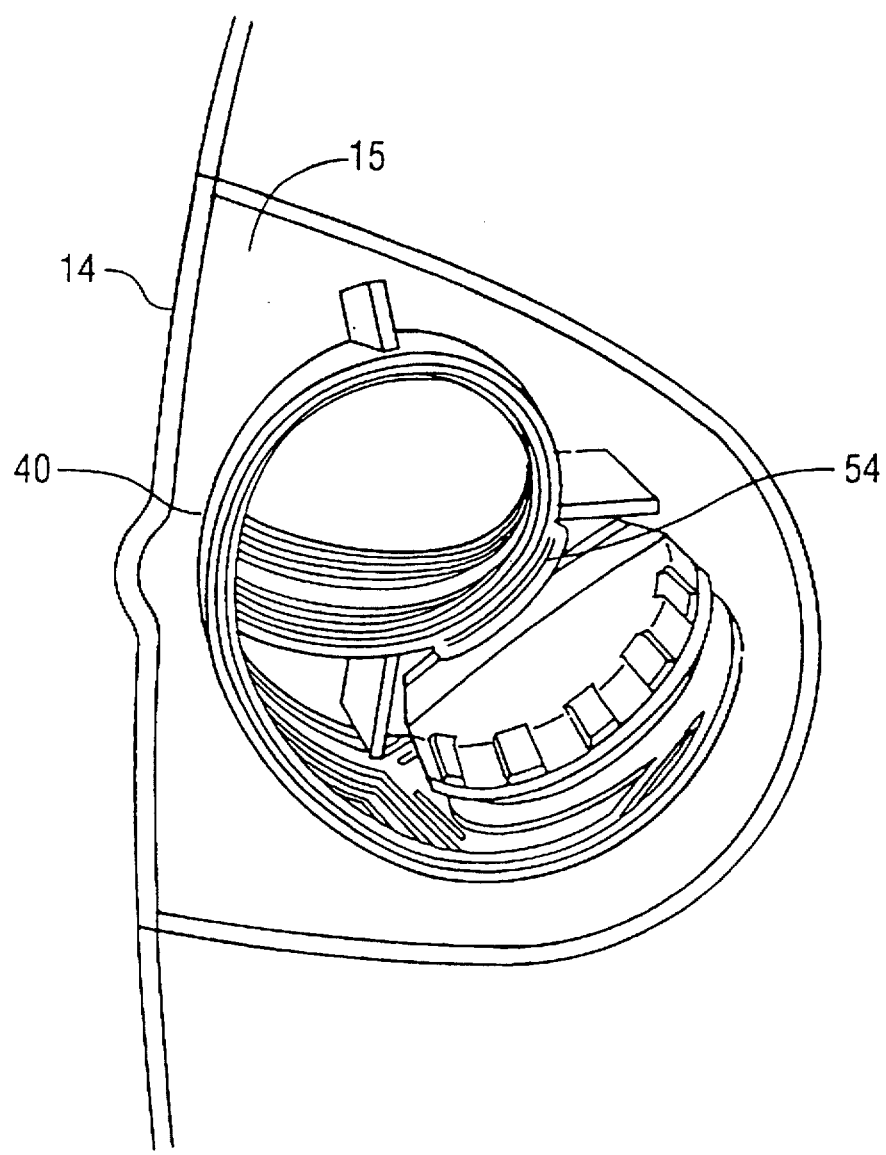
FIG. 4 is a side view of the preferred embodiment in the stowed position.

FIG. 4 shows a picture of the presently preferred embodiment of the fuel guard 40 in the stowed position. The guard has been rolled-up and stored in the automobile's fuel fill compartment 15. The fuel guard will remain in the stowed position as long as the door 14 to the fuel fill compartment 15 remains closed.

Figure 5:
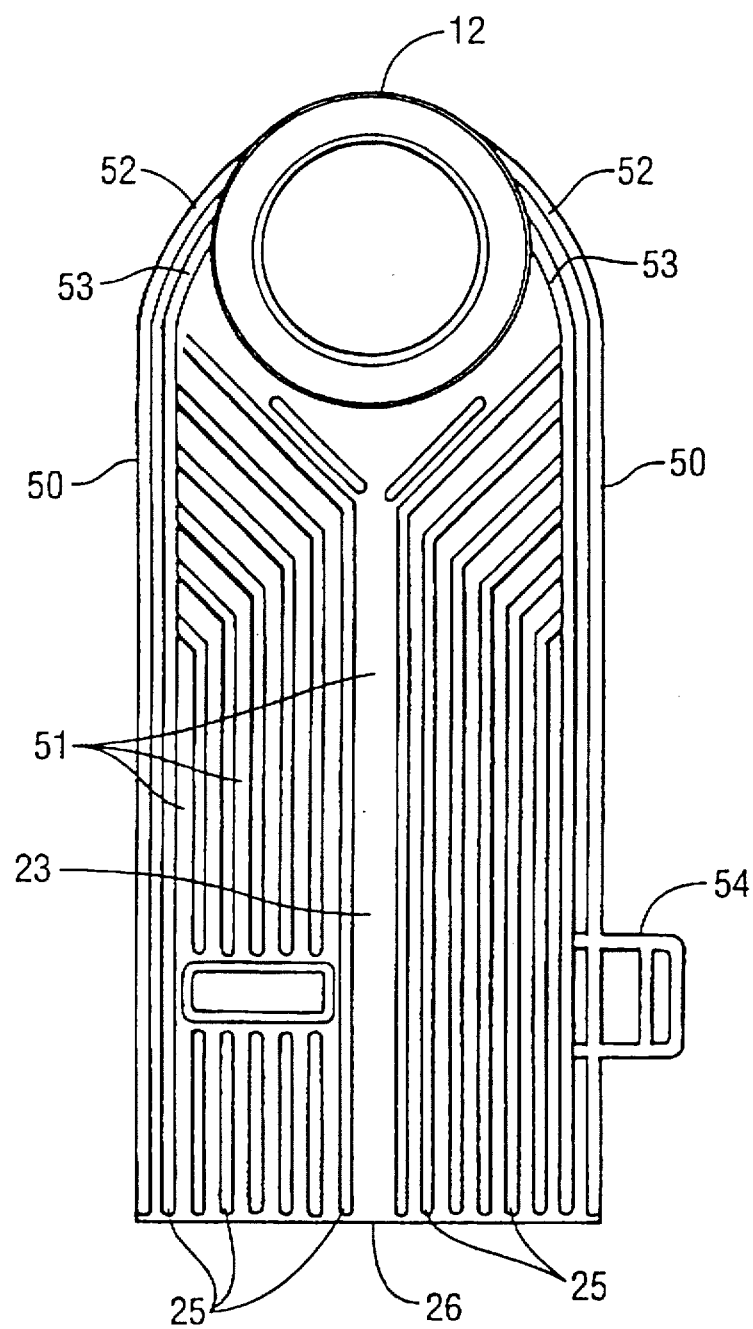
FIG. 5 is a detailed drawing of the front surface of the preferred embodiment of the fuel guard.

FIG. 5 is a detailed drawing of the front view of the presently preferred embodiment of the fuel guard. The fuel guard is comprised of a curved top edge 12, a straight bottom edge 26, and two side edges 50. The front surface 23 of the fuel guard is defined by the top, bottom, and side edges. A number of raised interior ridges 25 are formed on the front surface 23. These interior ridges 25 form the plurality of channels 24 that direct the spilled fuel down the front surface 23 of the guard towards the bottom edge 26.

FIG. 5 also shows the outmost ridge 52 and the exterior ridge(s) 53 of the presently preferred embodiment. The outmost ridge 52 and the exterior ridges 53 protect against gasoline running over the top edge 12 and side edges 50 of the guard and dripping onto the automobile's surface. Although only the outmost ridge 52 is required to implement the invention, the preferred embodiment includes one or more concentric exterior ridge 53 to enable the user to trim the sides of the guard so the guard can fit into smaller fuel fill compartments without losing effectiveness.

FIG. 5 also shows the side tab 54 of the preferred embodiment. In order to stow the guard in the fuel fill compartment after use, the user simply pinches the side tab 54 between his or her thumb and forefinger and rolls up the guard. The side tab 54 enables the use, to stow the guard without having to touch the front surface 23 of the guard which may contain some residual spilled fuel. Thus, the presently preferred embodiment of the guard protects the user from getting spilled fuel on his or her hands. The side tab 54 is also shown in FIG. 4.

Figure 6:
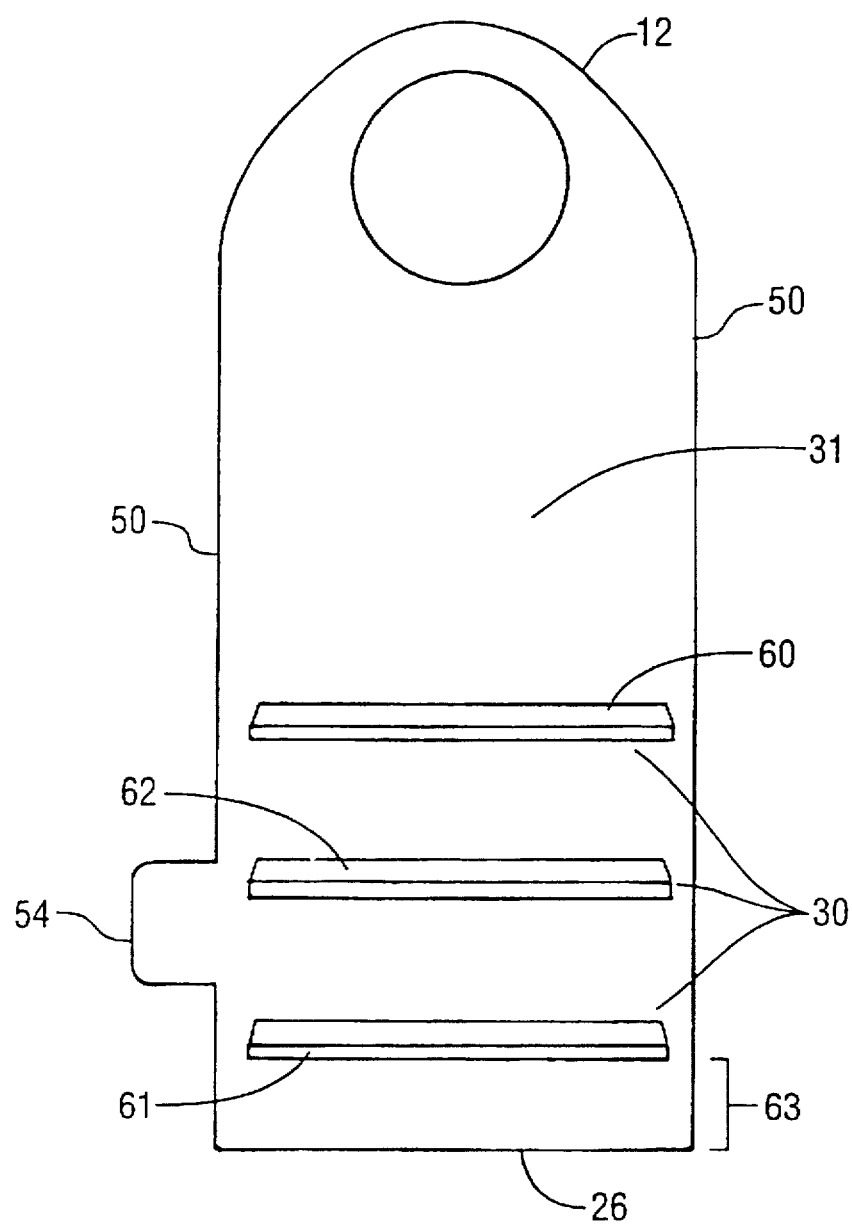
FIG. 6 is a detailed drawing of the back surface of the preferred embodiment of the fuel guard.

FIG. 6 is a detailed drawing of the rear view of the presently preferred embodiment of the fuel guard. This view shows the top edge 12, the side edges 50, the bottom edge 26, the side tab 54, and the back surface 31 of the guard. FIG. 6 also shows the stand-offs 30. The stand-offs 30 of the preferred embodiment are rectangular pieces of soft rubber formed integrally with the back surface 31 of the guard and running across the width of the back surface 31 of the guard parallel to the bottom edge 26. The stand-offs 30 in the preferred embodiment are all of equal length and extend virtually along the entire width of the back surface 31. The stand-offs 30 are of varying height, with the standoff 60 closest to the top edge 12 of the back surface 31 being the shortest and the stand-off 61 closest to the bottom edge 26 being the tallest. The interior stand-off(s) 62 are of intermediate height but increase in height as they run from top to bottom. The increasing height of the stand-offs 30 as they run from the top to the bottom of the back surface can also be seen in FIG. 3.

Although only a single stand-off would suffice to implement the invention, the presently preferred embodiment contains multiple stand-offs to permit the user to trim the guard to shorten it without losing effectiveness. In the preferred embodiment, the position of the bottom-most stand-off 61 in relation to the bottom edge 26 of the guard is important. To the extent that the bottom-most stand-off 61 is not flush against the bottom edge 26 of the guard, there will be an "overhang" 63 of the fuel guard beyond the bottom-most stand-off. If such an overhang 63 is too long, the portion of the fuel guard between the bottom-most stand-off 61 and the bottom edge 26 of the guard might tend to curl back towards the automobile's surface and direct spilled fuel towards the automobile's surface. On the other hand, if the bottom-most stand-off is placed flush against the bottom edge 26 of the guard, there will be no overhang. In that case, however, the adhesive force between the fuel guard and spilled fuel might overcome the force of gravity such that spilled fuel will not drip off the bottom edge 26 of the guard onto the ground, but will instead drip down the bottom surface of the bottom-most stand-off onto the automobile's surface. To avoid both of these undesirable effects, the bottom-most stand-off 61 in the presently preferred embodiment is positioned so that there is a slight overhang 63 of the guard over the bottom-most stand-off 61. In the presently preferred embodiment, the distance between the bottom-most stand-off and the bottom edge of the fuel guard, i.e., the length of the overhang 63, is approximately one-half inch. If a user wishes to trim the length of the guard, he or she should cut the guard approximately one-half inch below a stand-off.

Thus, an apparatus for protecting an automobile's surface from damage cause by fuel spills or contact with the fuel pump nozzle during refueling has been described.

What is claimed is:

1. A fuel guard to protect an automobile's surface adjacent to the automobile's fuel fill pipe, contained by a fuel filling compartment, from damage caused by incidental contact with the fuel spillage during refueling and nicks and scratches caused by incidental contact with the fuel pump nozzle, comprising:

a single sheet of flexible material having a top edge, two side edges, a bottom edge, and parallel front and back surfaces defined by said top, bottom, and side edges;

said sheet including a means for attaching a portion of said sheet, adjacent to said top edge, around said fuel fill pipe, said front surface containing a plurality of raised ridges forming at least one channel; and one or more stand-offs attached to said back surface and laterally spaced from said bottom edge of the sheet to keep said bottom edge of the sheet away from the surface of the automobile so that run-off fuel drips onto the ground and not onto the automobile.

2. The fuel guard of claim 1 wherein said means for attaching is a hole in the sheet adjacent to said top edge which stretches to fit fuel fill pipes of varying sizes.

3. The fuel guard of claim 1 wherein said means for attaching is a flexible collar in the sheet adjacent to said top edge which stretches to fit fuel fill pipes of varying sizes.

4. The fuel guard of claim 1 wherein said front surface further contains a raised outmost ridge running continuously along the top edge and both side edges of the sheet to prevent fuel from running over the side or top edges of the sheet.

5. The fuel guard of claim 1 wherein said front surface further contains one or more exterior ridges concentric to one another and said outmost ridge to enable the fuel guard to be trimmed for use on automobiles with smaller fuel fill compartments while still providing a ridge to prevent fuel from running over the side or top edges of the sheet.

6. A fuel guard to protect an automobile's surface adjacent to the automobile's fuel fill pipe, contained by a fuel filling compartment, from damage caused by incidental contact with the fuel spillage during refueling and nicks and scratches caused by incidental contact with the fuel pump nozzle, comprising:

a single sheet of flexible material having a top edge, two side edges, a bottom edge, and parallel front and back surfaces defined by said top, bottom, and side edges;

said sheet including a means for attaching a portion of said sheet, adjacent to said top edge, around said fuel fill pipe;

said front surface containing a plurality of raised ridges forming at least one channel to direct spilled fuel down said front surface of the fuel guard; and one or more exterior ridges concentric to one another and said outmost ridge to enable the fuel guard to be trimmed for use on automobiles with different sized fuel fill compartments while still providing a ridge to prevent fuel from running over the side or top edges of the sheet.

7. A fuel guard to protect an automobile's surface adjacent to the automobile's fuel fill pipe, contained by a fuel filling compartment, from damage caused by incidental contact with the fuel spillage during refueling and nicks and scratches caused by incidental contact with the fuel pump nozzle, comprising:

a single sheet of flexible material having a top edge, two side edges, a bottom edge, and parallel front and back surfaces defined by said top, bottom, and side edges;

said sheet including a means for attaching a portion of said sheet, adjacent to said top edge, around said fuel fill pipe;

said front surface containing a plurality of raised ridges forming at least one channel; and a side tab adjacent to either of said side edges to be grasped between the thumb and forefinger when rolling up the guard for storage inside the fuel fill compartment so the user can roll up the guard without getting fuel on his or her hands.

* * * * *